Dec. 18, 1962 K. HAIN 3,068,708
INTERMITTENT CHAIN-AND-CRANK DRIVE WITH
MATHEMATICALLY EXACT PAUSES
Filed April 27, 1960 3 Sheets-Sheet 1

Inventor:
KURT HAIN
by Mason & Rollin
ATTORNEYS

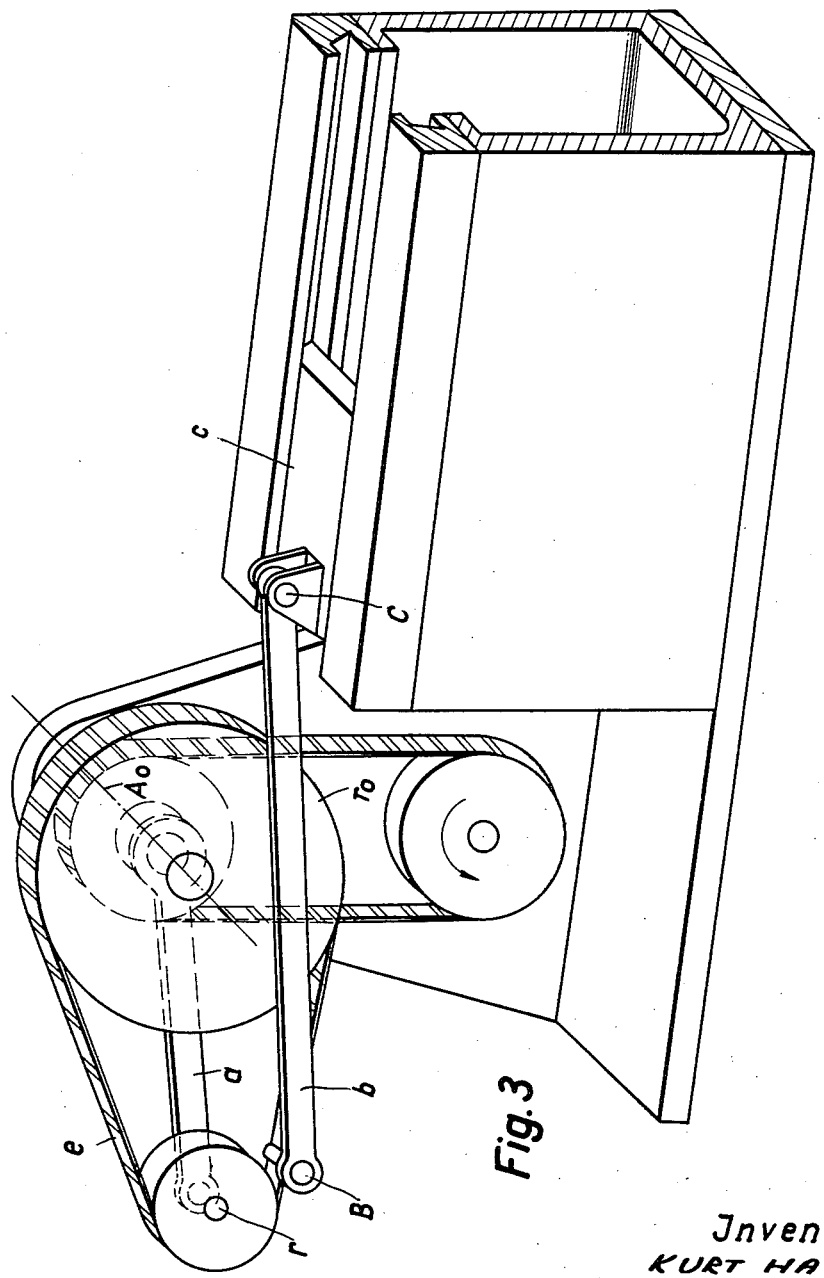

United States Patent Office 3,068,708
Patented Dec. 18, 1962

3,068,708
INTERMITTENT CHAIN-AND-CRANK DRIVE
WITH MATHEMATICALLY EXACT PAUSES
Kurt Hain, Braunschweig, Germany, assignor to Arnold
& Stolzenberg G.m.b.H., Einbeck-Hannover, Germany
Filed Apr. 27, 1960, Ser. No. 24,937
Claims priority, application Germany Sept. 11, 1959
6 Claims. (Cl. 74—37)

An intermittent drive is a transmission in which a driven member remains stationary for a certain period of time while the driving member continues to move, generally at constant angular velocity. The following distinction may be made:

(1) Oscillatory intermittent drives, in which the driven member oscillates to and fro, this oscillation being either interrupted by pauses in mid-swing or terminated by a pause at one or both extremes.

(2) Rotary intermittent drives, in which the driven member, like the driving member, revolves, but the driven motion is interrupted by one or more pauses. Rotary intermittent drives have been referred to as controllers, because they are used to perform timing operations, for example in the intermittent handling of goods and parts or for transferring work from one point of operation to another on turrets or turntables.

The success of an intermittent drive is to be rated in the first place by its pause precision, or exactness of positioning of the driven member despite continuing motion of other component parts. Duration of pause is referred to the associated angle of rotation of the drive crank, if it rotates uniformly. Brief pauses up to about a 90° angular displacement of the crank are comparatively easy to effect. Longer pauses may require more elaborate gearing, so that pause duration is another factor of merit.

In all such intermittent drives, it is esteemed an especial advantage that a puse shall involve a locked condition; that is, it shall not be possible for the driven member to feed motion back into the transmission. Unlike a mere dead-center condition in a cyclic mechanism, such a locked condition should extend cover a more or less extensive interval of motion. Since such locking of a component part requires no pawls or other locking devices, the concept of "natural" locking is appropriate.

Intermittent settings may be achieved in all the several classes of cyclic mechanisms. Cam mechanisms have generally been disclosed only as intermittent drives with driven member oscillating to and fro, a cam being used as uniformly rotating drive member. Alternatively, the driven member may be a reciprocating slide. In these cases, pauses are quite readily effected by means of circular cam surfaces centered on its axis of rotation. Such simple cam drives will not serve as rotary intermittent drives or controllers. Known types of these have several cam mechanisms in series, motion being transmitted successively by the component drives. This calls for extreme precision machining to avoid both interference and slack or backlash at the critical points. Cam mechanisms do have the advantage that a given mathematical motion can be exactly reproduced; however, they have only line contact between cam and follower. In consequence of such line contact, a cam mechanism will not transmit very large forces and torques, forces due to inertia during periods of transition between pauses and periods of motions are a critical factor. Furthermore, common cam mechanisms with open tracks require spring-loading means for the follower to be included in the transmission, and these cause additional stress between cam and follower. Even minor wear and abrasion on the cam track will alter the kinetics of the entire mechanism, and such changes will as a rule further increase the stresses, with resulting still further wear, until the drive becomes unserviceable. In addition to these facts, it remains to be considered that the making of precision cams is comparatively expensive. Primitive template procedures are still largely required; though attempts are now often made to use positive movements for makig cam contours on milling or grinding machines.

Crank drives are made up of simple levers and articulations, with so-called "low grade" pairs of elements. Examples of low-grade pairs of elements are the journal bearing, consisting of shaft and bushing, and the slide bearing, consisting of slide and race. The advantage of low-grade pairs of elements lies in area contact between the parts. This enables considerably larger forces to be transmitted than by line contact alone. Wear in the bearings hardly manifests itself in any change in the form of motion. No crank drives have heretofore been known that are able to execute pauses with mathematical exactitude, at any considerable speeds. In the main, the problem is to bring the characteristic compound curves of a crank mechanism into partial coincidence with an arc of a circle. Much skill and knowledge on the part of the designer is therefore needed to achieve high pause precision with the aid of crank mechanisms. At least six-element positive crank mechanisms are required, with seven articulations. Since one element may be a support frame, there must always be at least five moving members. It is often difficult even to accommodate these moving levers in a preassigned machine space or housing. In the case of six-element crank drives, the length of pause in terms of the angle concurrently swept out by the drive crank is limited. If longer pauses are wanted, more elaborate crank drives of at least eight elements must be adopted.

Among rotary intermittent drives, or controllers, the Geneva cross mechanism has found widespread application. Kinematically, it is a crank during the period of motion and a cylinder lock during the pause. Hence at each transition from pause to motion and vice versa, there is a disengagement of the transmission and a transfer of motion to a different component. When the parts are accurately made, the cylinder lock functions satisfactorily, and the commencement of motion, owing to the perpendicular entry of the pin into the straight slot, is free from concussion; that is, the velocity of the driven member varies smoothly from standstill. In practice, however, the engagement of the pin with the slot cannot be made close enough to produce a smooth transition. For these reasons, this movement suffers from natural limitations of maximum speed.

The present invention relates to chain-and-crank transmissions, or combined chain drives in conjunction with levers and articulations. Their distinguishing feature is that the motion is transmitted from a chain pin. In a simple chain drive, one of the two sprocket wheels can be rendered stationary and the frame employed as driving member. The result is a planetary chain drive. Within the angle of contact of the chain with the stationary sun wheel, a chain pin will remain mathematically stationary. While it lies along the unsupported span, its trajectory will be a true involute. On the angle of contact with the planetary or revolving wheel, it will execute a cycloid curve, and this will be followed by another involute trajectory.

If a lever is articulated to such a chain pin, at the other end, to a driven lever pivoted to the frame, it is possible by suitable choice of lever arms and location of the frame pivot to cause the latter, driven lever to execute either an oscillating or a rotary motion interrupted at intervals by pauses each corresponding to the stationary phase of the chain pin while in contact with the sun wheel.

The device according to the invention will now be more fully described with reference to the accompanying drawings, but it should be understood that these are given by way of illustration and not of limitation and that many changes in the details may be made without departing from the spirit of the invention.

In the drawings,

FIG. 3 shows a chain-and-crank drive for converting uniform rotary motion into a reciprocating driven motion interrupted by a pause in the going and return phases.

Figure 1:
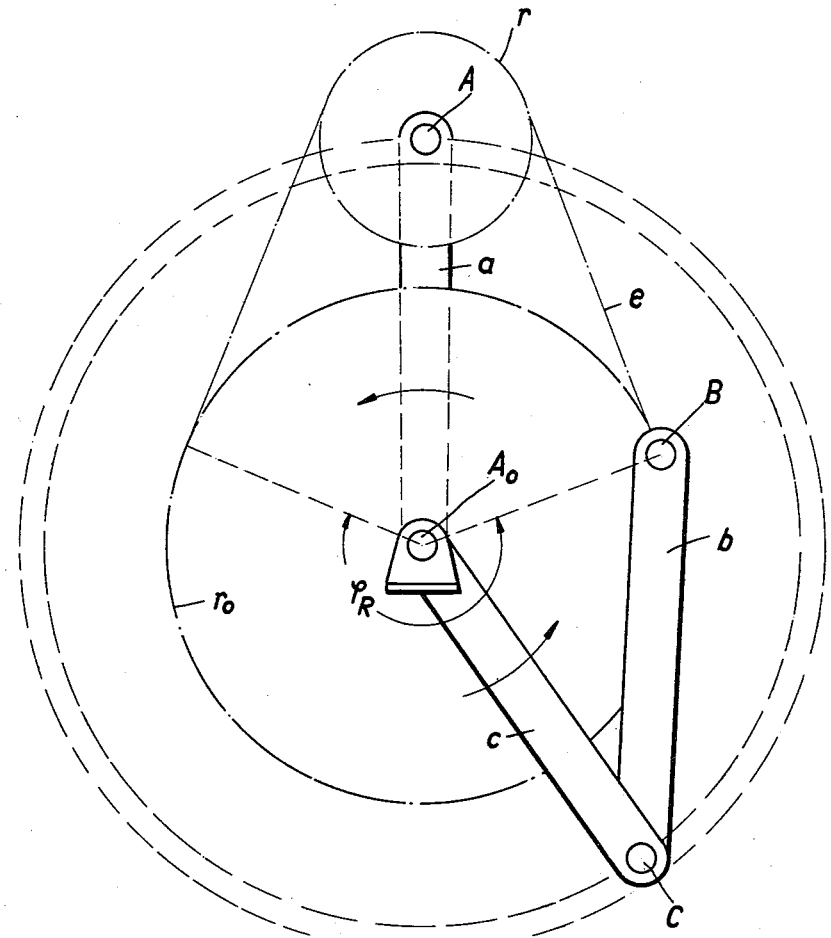
FIG. 1 shows a crank mechanism embodied as a rotary intermittent drive, or controller.

Referring to FIG. 1, the support means or frame $a$, acting as drive member of the mechanism as a whole, rotates at constant angular velocity about the fixed axes $A_O$. The central body or sun wheel $r_O$ is stationary, while the satellite or wheel $r$, rotatably journaled at A, executes rotary motions both about fixed point $A_O$ and secondarily about axes A. The two wheels $r_O$ and $r$ are encircled by a flexible member such as the chain $e$. To a pin B of that chain $e$, a lever $b$ is articulated, as well as to the driven lever $c$ at articulation C. When the drive member $a$ rotates to the left, the chain pin B, in the situation illustrated, remains at rest until frame $a$ has unrolled chain $e$ off the closed peripheral surface of the sun wheel $r_O$ long enough for pin B to be set in motion again. Frame $a$ has meanwhile traveled through an angle $\phi_R$ exactly equal to the angle of contact of chain $e$ with sun wheel $r_O$; whose closed surface lies in a plane. The then remaining length of chain, namely the length not in contact with wheel $r_O$ determines the angle of rotation $\phi_M$ swept out by frame $a$ while driven lever $c$ is being actuated by chain link B, now in motion. This determines the duty cycle $$m = \frac{\phi_M}{\phi_R}$$

in terms of angle of rotation of driving frame or arm $a$, as equal to the ratio of the number of links in contact with the stationary sun wheel $r_O$ to the number of links remaining out of the total. The angle of rotation $\phi$ traversed by driven lever $c$ in the course of a cycle need not be the same as the angle of motion $\phi_M$ of arm $a$; on the contrary, further freedom is afforded by choice of the lengths of members $b$ and $c$. The pivot $A_O$ of frame $a$ need not coincide with the pivot of driven lever $c$; such coincidence, however, producing as it does a so-called double joint, represents something of a simplification.

By choice of different lengths of arm $a$ and different wheel diameters, the range of duty cycle is altered. Alternatively, however, one or more additional sprocket wheels may be provided on the revolving frame $a$, deflecting chain $e$ so as to vary the angle of contact with the stationary sun wheel $r_O$ in any desired manner. By simple means, in fact, it can be rendered possible to change the angle of contact, and hence the duty cycle, while the mechanism is in motion. Such controllers capable of readjustment while in motion have not been known heretofore.

The special pattern of involute and cycloid curves merging with each other admits of approximation by a circular arc. If element $b$ is assigned the length of the radius of such an approximate circle and articulated to a driven lever $c$ as before, the result will be a second pause, not indeed mathematically exact but yet fairly accurate. In such cases, however, the pivot of driven member $c$ must in general be rendered distinct from the center of rotation of drive member $a$. Alternatively again, this special involute and cycloid pattern will yield motions of driven member $c$ such that this driven member will revolve, remain mathematically stationary during the angle of contact of the chain with wheel $r_O$, and execute a brief retrograde movement while in motion. Such retrograde phases in full rotation of this member may be termed a "pilgrim's progress," or back-step, movement.

The articulation of member $b$ to chain $e$ need not necessarily be precisely a pin of the chain itself; instead, one chain link may be so constructed that the articulation B of lever $b$ lies inside or outside the chain. This results in different involute and cycloid curves, which in turn permit further variations in the driven motion of member $c$.

Figure 2:
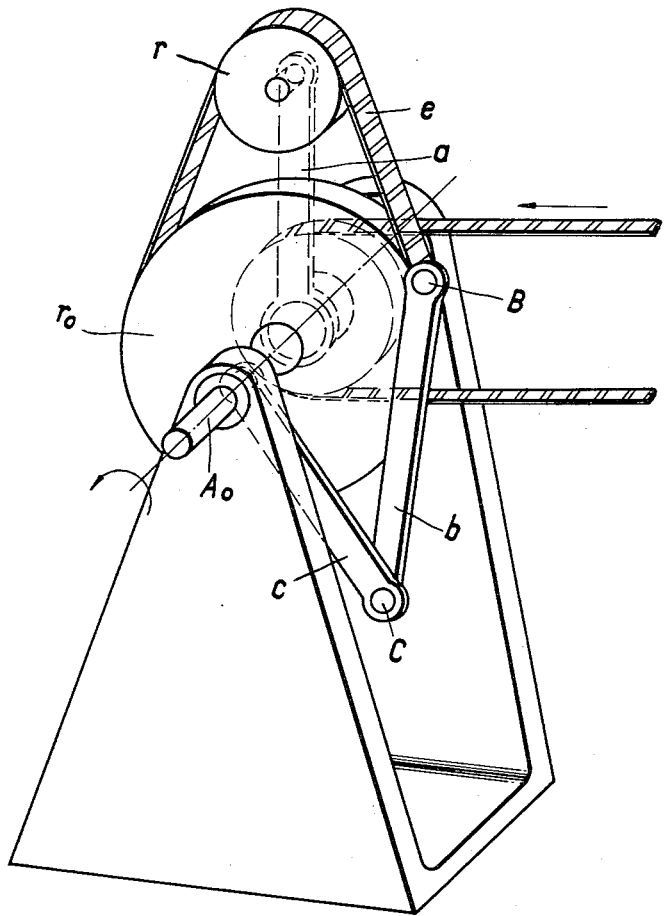
FIG. 2 shows a perspective view of a rotary intermittent drive as in FIG. 1.

Referring to FIG. 2, frame $a$ may be driven by a tension drive, for example a chain or belt transmission, or else by gearing. Axis $A_O$ may be embodied in a through shaft, adding to the stability of the mechanism.

FIG. 3 shows a chain-and-crank drive for converting a uniform rotary motion into a reciprocating driven motion, the forward and return phases of which are each interrupted by a pause. The principle is the same as in the previous example; however, the driven member $c$ is embodied as a slide displaceable in a race. Upon uniform rotation of drive frame $a$ and articulation of connecting rod $b$ to chain pin B, the latter remains mathematically stationary during the phase of contact of chain $e$ with the stationary sun wheel $r_O$. Owing to the form of the involute and cycloid curves this pause occurs between the extreme positions of driven member $c$. The movement of this driven member may be the same in forward and return directions if the straight-line path of pivot C prolonged passes through the axis $A_O$. If it does not, the forward and return motion of driven member $c$ can be rendered asymmetrical.

Further transmission of motion from chain pin B may alternatively be effected by means of linkages of more than two levers $b$ and $c$. By providing more levers, further variant forms of driven motion can be achieved. In addition, slide bearings may be provided in moving levers, with resulting trammel linkages. This also affords new forms of motion for driven member $c$, adaptable to practical requirements. Finally, it may be mentioned that one chain pin B may drive several driven levers, and that of course also a plurality of driven systems $b$, $c$ may be present in parallel, each articulated to a different chain pin B.

What I claim is:

1. A mechanical movement for intermittently displacing a load and for immobilizing it between displacements, comprising a fixed central body having a closed peripheral surface lying in a plane and surrounding an axis extending generally transversely to said plane, a satellite revolvable about said axis in said plane, a closed flexible member encircling said body and said satellite in positive engagement with said surface, a link element articulated to said member at a pivotal junction, means operatively connecting said element with said load, and drive means operatively connected with said satellite for continuously swinging said satellite about said axis whereby said junction is alternately held against said surface and displaced between peripherally spaced locations thereon.

2. A mechanical movement according to claim 1 wherein said peripheral surface is concentric with said axis.

3. A mechanical movement according to claim 1 wherein said central body is a sprocket wheel, said flexible member is a chain positively engaging said sprocket wheel, and said satellite is another sprocket wheel, further comprising support means swingable about said axis, said other sprocket wheel being journaled to said support means at a location offset from said axis, said drive means comprising a source of motive force and a transmission operatively coupling said source to said support means for swinging said support means about said axis with substantially constant angular velocity.

4. A mechanical movement according to claim 1 wherein said link means comprises a bar pivoted at one extremity thereof to said member, and a crank rotatable about said axis and articulated to the other extremity of said bar, said load being operatively connected to said other extremity for displacement with interrupted harmonic motion.

5. A mechanical movement for intermittently displacing a load and for immobilizing it between displacements comprising a fixed central sprocket wheel, support means revolvable about the axis of said central wheel in the plane thereof, a satellite sprocket wheel rotatably journaled to said support means and offset from said central wheel, a closed chain encircling said wheels in positive engagement therewith, a link member articulated to said chain at a pivotal junction, means operatively connecting said link member with said load, and drive means operatively connected with said support means for rotating said support means about said axis whereby said junction is alternately held against said central sprocket wheel and displaced between peripherally spaced locations thereon.

6. A mechanical movement according to claim 5, further comprising a connecting bar pivotally secured at one extremity thereof to said link, and guide means at the other extremity of said bar for constraining said extremity to substantially rectilinear motion, said guide means comprising a slide member articulated to said other extremity and rail means for guiding said slide member, said load being coupled to said other extremity for actuation with interrupted reciprocating motion upon continuous rotation of said support means about said axis.

References Cited in the file of this patent

FOREIGN PATENTS

| 7,664 of 1885 | Great Britain | June 24, 1885 |
| 697,486 | France | Nov. 4, 1930 |
| 272,905 | Switzerland | Apr. 2, 1951 |